United States Patent [19]
Goossen et al.

[11] Patent Number: 5,589,974
[45] Date of Patent: *Dec. 31, 1996

[54] MICROMECHANICAL MODULATOR

[75] Inventors: Keith W. Goossen, Aberdeen; James A. Walker, Howell, both of N.J.

[73] Assignee: Lucent Technologies Inc., Murray Hill, N.J.

[*] Notice: The term of this patent shall not extend beyond the expiration date of Pat. No. 5,500,761.

[21] Appl. No.: 479,476

[22] Filed: Jun. 7, 1995

Related U.S. Application Data

[63] Continuation-in-part of Ser. No. 187,676, Jan. 27, 1994, Pat. No. 5,500,761.
[51] Int. Cl.[6] ................................................. G02B 26/00
[52] U.S. Cl. ............................................. 359/290; 359/248
[58] Field of Search .............................. 359/290, 291, 359/245, 248

[56] References Cited

U.S. PATENT DOCUMENTS 4,849,071  7/1989  Evans et al. .......................... 156/644

OTHER PUBLICATIONS

Solgaard, et al., "Deformable Grating Optical Modulator," Optical Letters, vol. 17, No. 9, May 1992, pp. 688–690.
Wiszniewski, et al., "Mechanical Light Modulator Fabricated on a Silicon Chip Using SIMOX Technology," International Conference on Solid State Sensors & Actuators, Yokohama, Japan, Jun. 7–10, 1993, pp. 1027–1030.

*Primary Examiner*—Georgia Y. Epps
*Assistant Examiner*—Dawn-Marie Bey

[57] ABSTRACT

A method and apparatus for modulating an optical signal, and a method for fabricating such an apparatus. The modulator comprises a membrane having at least one layer, and a substrate, spaced to form a air gap. The membrane is suspended in a first position over the substrate by a flexible support arrangement such that the size of the air gap may vary. The layers of the membrane are formed so that the refractive indices of such layers have a particular relationship to the refractive index of the substrate, and have a particular thickness. Bias is applied to the membrane and the substrate to create a force that causes the membrane to change its position relative to the substrate, causing the size of the air gap to change. The reflectivity of the device to an optical signal varies as the size of the air gap changes.

20 Claims, 12 Drawing Sheets

MICROMECHANICAL MODULATOR

This case is a continuation-in-part of Ser. No. 08/187,676 filed Jan. 27, 1994, now U.S. Pat. No. 5,500,761.

FIELD OF THE INVENTION

This invention relates generally to optical modulators, and more particularly to surface normal mechanical optical modulators.

BACKGROUND OF THE INVENTION

It is desirable in optical wavelength-division-multiplexing networks' to have inexpensive light modulators that have high contrast and wide optical bandwidths. In certain cases, such as audio and video transmission, these modulators need only operate at frequencies up to several megahertz.

A modulation device particularly well suited for the above application is a surface normal micromechanical modulator. This device may be described as having a variable air gap defined by two layers of material. Typically, surface normal light modulators operate by changing the amount of light reflected in the surface normal direction, i.e., the direction normal to the substrate surface. This may be achieved by varying the variable air gap, which alters the optical properties of the device.

One such micromechanical modulator has been described by Aratani et al. in "Process and Design Considerations for Surface Micromachined Beams for a Tuneable Interferometer Array in Silicon, " Proc. IEEE Microelectromech. Workshop, Ft. Laud, Fla., Feb. 7–10, 1993 at 230–35. This article, and all other articles referenced in this specification are herein incorporated by reference in their entirety. Aratani's modulator is described as having a diaphragm mirror consisting of a polysilicon/silicon nitride multilayer supported by thin beams over a substrate, also partially mirrored by a polysilicon/silicon oxide multilayer. As a voltage is applied between the membrane and the substrate, the membrane is pulled toward the substrate. The device is reported to behave as a Fabry-Perot interferometer wherein, given two mirrors having equal reflectivity, the reflectivity of the device approaches zero at the resonant wavelength of the cavity. As the membrane moves, altering the cavity, the reflectivity of the device rises. The change in reflectivity modulates the optical signal. While a large change in reflectivity is supposedly achieved, the optical bandwidth of the optical resonator based modulator is limited. The contrast ratio of such a device falls off sharply as the wavelength of the incident light varies from the resonant wavelength of the device.

A second micromechanical modulator was described by Solgaard et al in "Deformable Grating Optical Modulator," Optics Lett. 17(9) 688–90 (1992). This modulator was described as having a reflection phase grating of silicon nitride beams that is coated with metal and suspended over a substrate coated with metal. An air gap separates the grating and substrate. In the absence of a biasing voltage, the path length difference between the light reflected from the grating beams and that reflected from the substrate is equal to the wavelength of the incoming light. These reflections are therefore in phase, and the device reflects the light in the manner of a flat mirror. When a voltage is applied between the beams and the substrate, the beams are brought in contact with the substrate. The total path length difference between the light reflected from the grating beams and that reflected from the substrate changes to one half of the wavelength of the incident light. In this case, the reflections interfere destructively, causing the light to be diffracted.

The deformable grating optical modulator does not achieve a low reflectivity state. Rather, it switches to a diffracting state. In the diffracting state, incident light is scattered into higher-order diffraction modes of the grating, so that the amount of light reflected into the zero order (surface-normal) mode is minimized. Such diffraction may be an undesirable aspect of the deformable grating optical modulator. If the numerical aperture of the incoming fiber or detection system is large enough to pick up the higher order diffraction modes, a degradation in contrast will result. Further, if this device is implemented in a system using arrays of optical beams or fibers, a significant crosstalk may be introduced.

Accordingly, there is a need for a micromechanical modulator which provides high contrast modulation for optical signals over a range of wavelengths.

SUMMARY OF THE INVENTION

An apparatus and method for modulating an optical signal, and a method for fabrication of such an apparatus, are disclosed. The apparatus, which may be formed on a semiconductor wafer or chip, comprises a membrane and a substrate that are spaced to form an air gap. In one embodiment, the membrane consists of at least one layer suspended over the substrate by flexible support arms. The layer or layers of the membrane are characterized by specific relationships between the refractive indices of the layers and the refractive index of the substrate, and have a particular thickness.

In operation, a bias voltage is applied to the membrane and the substrate generating an electrostatic force that moves the membrane toward the substrate. As the membrane moves, the air gap changes. Relative maxima and minima reflectivity states are encountered as the air gap changes in size by one-quarter of a wavelength of the optical signal being modulated. If the air gap is an odd multiple of one-quarter of a wavelength of the optical signal, the membrane and air gap function as a high reflectivity coating. If the air gap is an even multiple of one-quarter wavelength, the membrane and air gap function as an anti-reflection coating. The change in reflectivity facilitates modulating the optical signal.

Preferably, the distance travelled by the membrane toward the substrate under bias is less than one-third the size of the air gap when the membrane is in the unbiased position. Most preferably, when the membrane is in its unbiased position, the air gap ranges from about sixty-five to seventy percent of the wavelength of the optical signal, and the air gap is about fifty percent of the wavelength of the optical signal when the membrane is in a biased position.

In one embodiment, the apparatus may be fabricated by providing a conductive substrate and forming a two-layer conductive membrane on the substrate so that an air gap is defined between the membrane and the substrate. The membrane and air gap are formed by various etching and photolithographic methods.

BRIEF DESCRIPTION OF THE DRAWINGS

Further features of the invention will become more apparent from the following detailed description of specific embodiments thereof when read in conjunction with the accompanying drawings, in which like elements have like reference numerals and in which:

FIGS. 12–15b show successively the formation of the modulator of FIG. 11, where FIGS. 12, 13, 14a and 15a are sideviews, and FIGS. 14b and 15b are plan views;

DETAILED DESCRIPTION OF THE INVENTION

Figure 1:
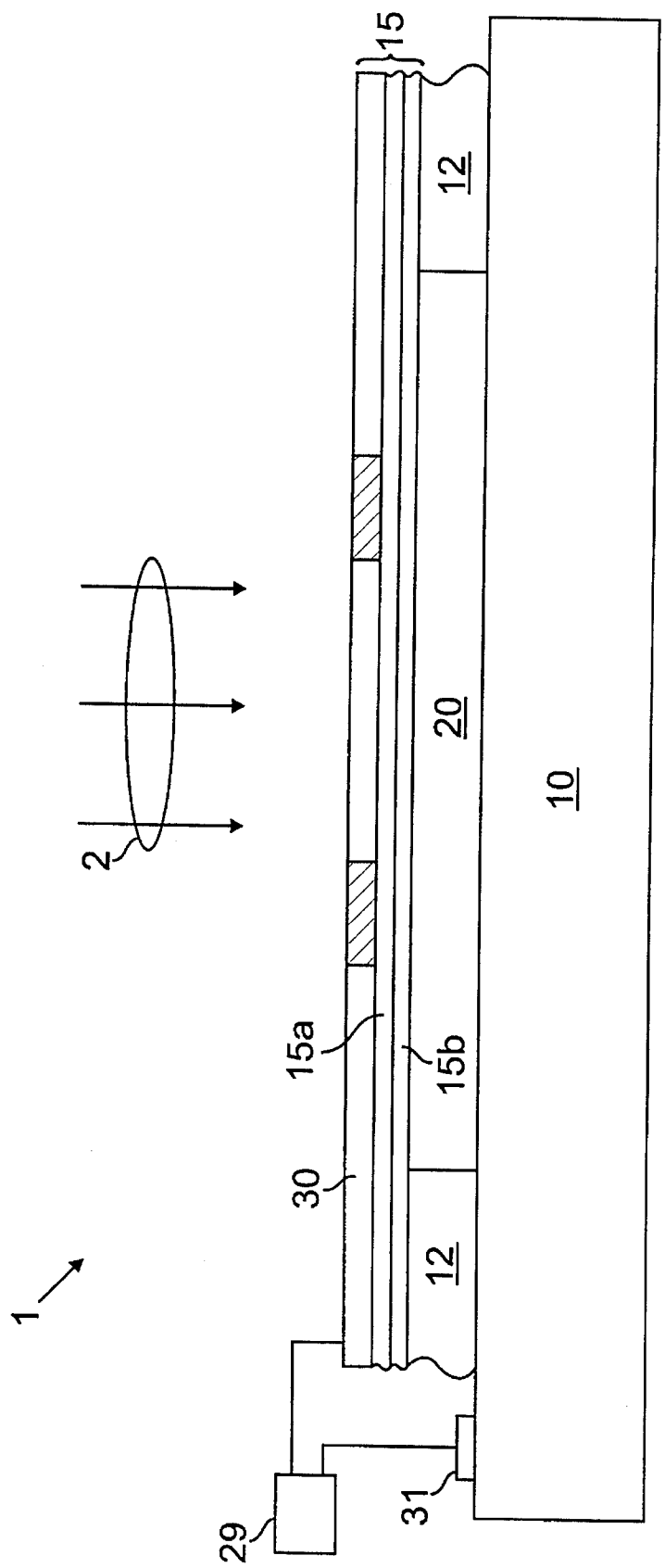
FIG. 1 is a side view of an embodiment of a micromechanical modulator according to the present invention where the modulator is shown in its unbiased position.
Figure 2:
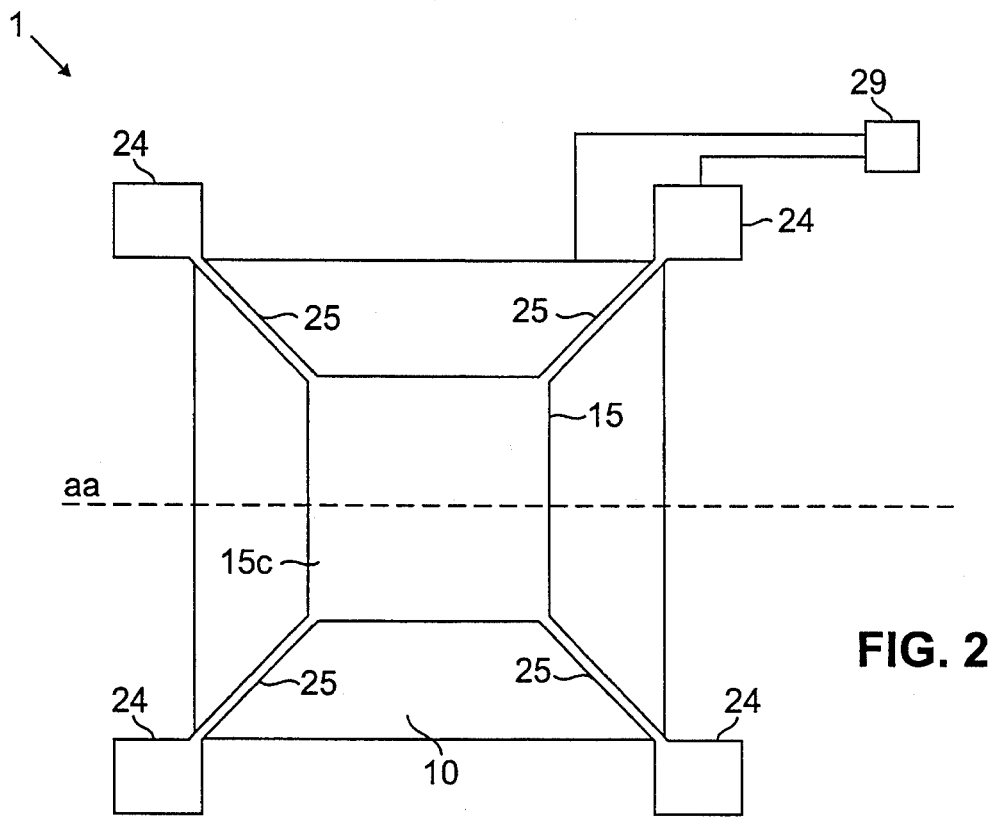
FIG. 2 is a plan view of the micromechanical modulator of FIG. 1.
Figure 2A:
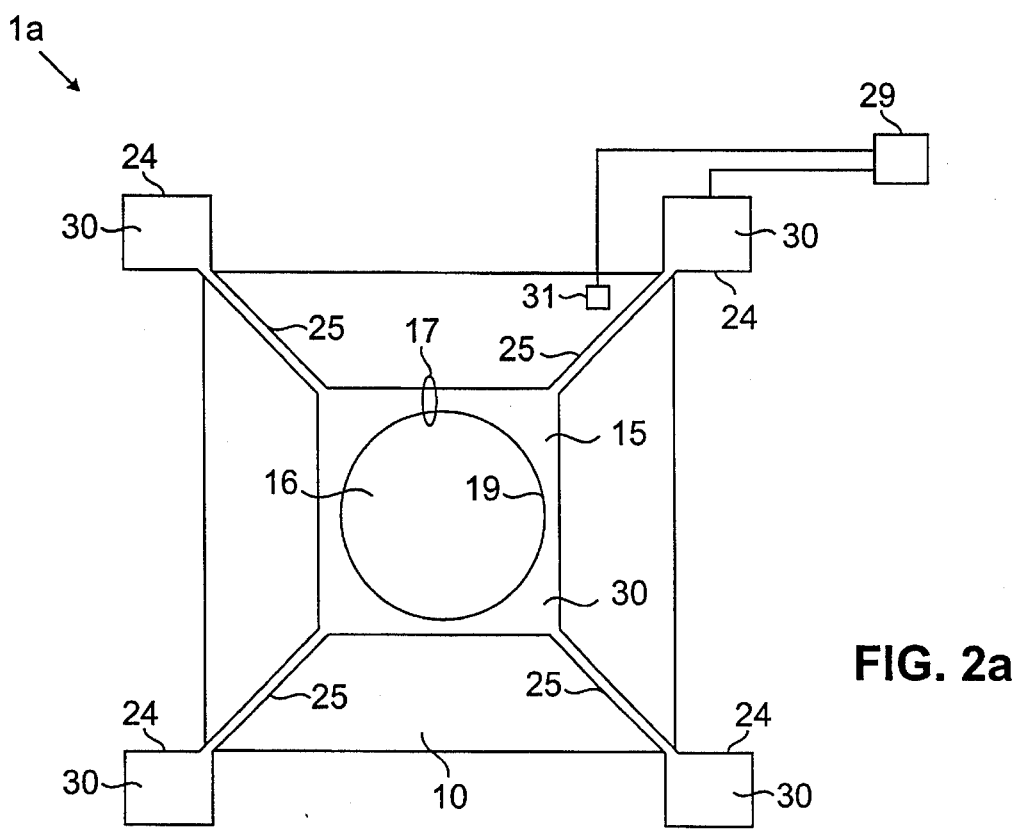
FIG. 2a is a plan view of a second embodiment of a micromechanical modulator according to the present invention wherein a conductive layer is deposited on top of the membrane and support arms.

FIGS. 1 and 2 show a preferred embodiment of a micromechanical modulator 1 according to the present invention. As shown in FIG. 1, which is a cross-sectional view through line aa in FIG. 2, the device comprises a substrate 10 and a membrane 15 having one or more layers, such as layers 15a and 15b. The membrane 15 and substrate 10 are spaced from each other, and define an air gap 20 between them. As shown in FIG. 2, which is a plan view of the apparatus of FIG. 1, the membrane 15 is suspended over the air gap 20 by support arms 25. The substrate 10 and the membrane 15 should be suitably conductive so that a voltage may be applied across them generating an electrostatic force to move the membrane towards the substrate. The voltage may be supplied by a controlled voltage source 29. If the substrate 10 and at least one of the layers comprising the membrane 15 are not conductive, electrodes should be provided. For example, as shown in FIG. 2a, an electrode 30 comprising a layer of conductive material may be disposed on the membrane. If the substrate is non-conductive, an electrode may be formed in the substrate by doping the substrate with suitable materials. Doping methods include ion implantation, selective diffusion and other methods known to those skilled in the art. The devices 1 and 1a may be suitably formed on a semiconductor chip or wafer.

Preferably, the substrate 10 is formed of a conductive material, which is either transparent or absorbing over the operating optical bandwidth. Suitable materials include, but are not limited to, silicon, gallium arsenide, indium phosphide, germanium or indium tin oxide (ITO) coated glass. If a semiconductor material is used for the substrate, it should preferably be appropriately doped. For example, if the substrate is silicon, it is preferably doped with any Group III or Group V element, typically phosphorus or boron. Such doping should enhance device speed.

The membrane 15 shown in FIGS. 1 and 2 is comprised of the layer 15a of material which is characterized by a refractive index which is approximately equal to the square root of the refractive index of the substrate 10. The layer 15a functions as a reflection/anti-reflection layer as will be described below. Suitable materials for the layer 15a include, without limitation, silicon oxide, or, more preferably, silicon nitride. The membrane 15 may also comprise further optional layers such as the layer 15b. The layer 15b is characterized by a refractive index which is approximately equal to the refractive index of the substrate 10. The layer 15b will typically be formed of the same material as the substrate 10, preferably silicon. If silicon is used for the layer 15b, it may have a polycrystalline structure, such as polysilicon, or it may have an amorphous or single crystal structure. The layer 15b functions as a strained layer for producing tension in the membrane 15, as described in more detail later in this specification.

Figure 18:
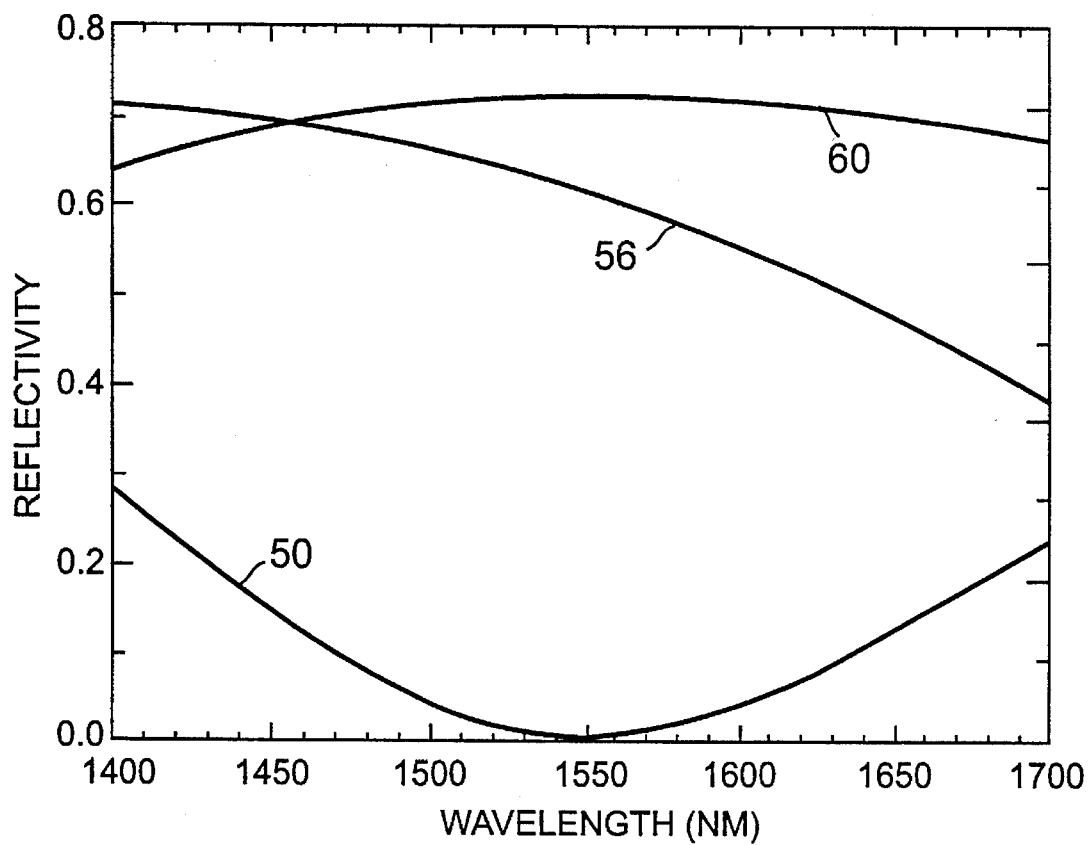
FIG. 18 is a plot of reflectivity vs. wavelength of the optical signal for a modulator having a one-layer membrane according to the present invention.
Figure 19:
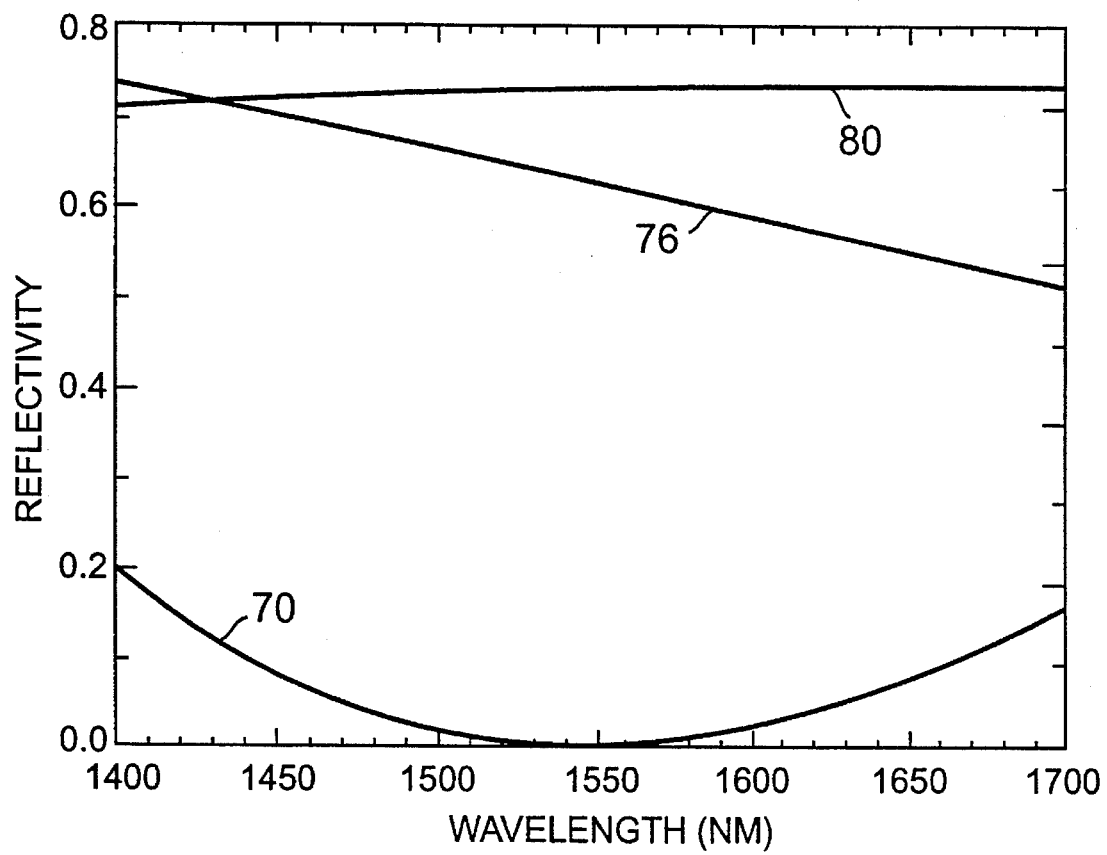
FIG. 19 is a plot of reflectivity vs. wavelength of the optical signal for a modulator having a two-layer membrane according to the present invention.

The thickness of the layers 15a and 15b of the membrane 15 is preferably about one-quarter of a wavelength (as measured in the material comprising the layer) of an incident optical beam 2. Where the incident optical beam 2 is characterized by a single wavelength, the membrane thickness is readily determined. The incident optical beam 2, however, may be comprised of a number of spectral components of differing wavelengths. For example, the incident optical beam 2 may have a bandwidth extending from 1400 nm to 1700 nm. In such a case, the wavelength selected as the basis (the basis wavelength) for the membrane thickness is determined by selecting the wavelength at the mid-point, i.e., the center wavelength, of the bandwidth. The center wavelength is 1550 nm for the previous example. Some loss in modulator performance, i.e, contrast, may be experienced as the wavelength of the spectral components deviates from the basis wavelength. This is illustrated in FIGS. 18 and 19.

Figure 3:
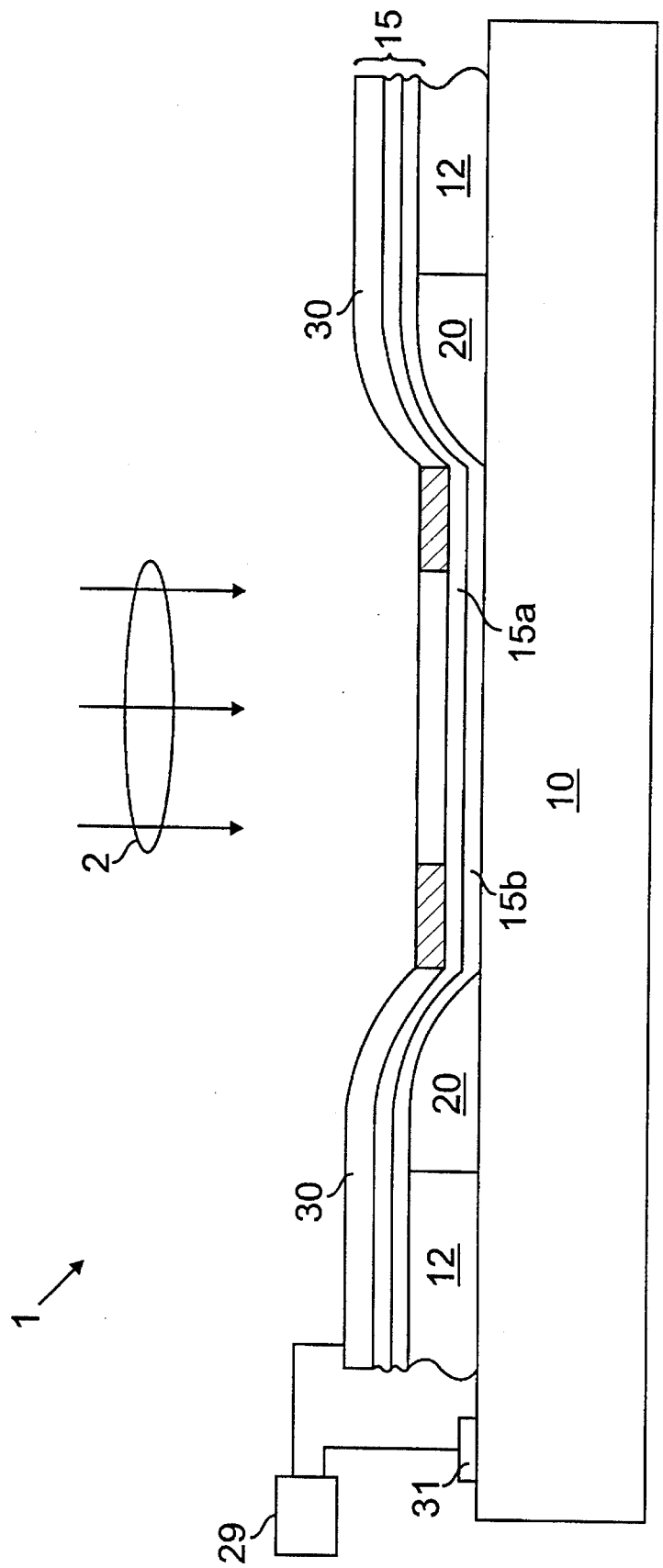
FIG. 3 is a side view of the modulator of FIG. 1 under bias.

The height of the air gap 20, i.e, the distance between the membrane 15 and substrate 10, may be a multiple of about one-quarter of the basis wavelength in the unbiased position. In other words, the air gap 20 should be $m\lambda/4$, where m is an integer. If the air gap 20, in the unbiased position, is an odd multiple of one-quarter of the basis wavelength, the membrane 15 and air gap 20 function as a high reflection mirror. If the air gap 20 is an even multiple of one-quarter of the basis wavelength, the membrane and air gap serve as a anti-reflection coating for the substrate 10. As an electrical signal, such as a varying voltage, is applied to the membrane and the substrate, an electrostatic force is generated between them. This force causes the membrane 15 to move toward the substrate, as shown in FIG. 3. As the membrane 15 moves from its unbiased position, the reflectivity of the device changes. As the membrane 15 moves one-quarter of the basis wavelength, a minimum or maximum reflectivity state will be encountered, depending upon the state of the membrane 15 in the unbiased position.

The aforementioned behavior is a function of the relationship of the refractive index of the membrane layer 15a to the refractive index of the substrate 10, as well as the thickness of the layer 15a. If the refractive index of the layer 15b is about equal to the square root of the refractive index of the substrate, an anti-reflection condition can be created. This relationship is well known to those skilled in the art. See Condon and Odishaw, ed., "Handbook of Physics, " at 6-102–6-103, (2nd ed., McGraw-Hill, 1967). Modulation of an optical signal is thus achieved by altering the reflectivity of the device.

As previously described, maximum and minimum reflectivity states are observed at integer multiples of one-quarter of the basis wavelength. Nothwithstanding, in a presently preferred embodiment, the air gap 20 is approximately 0.65 to 0.7 times the basis wavelength. The reason for this deviation is as follows. An instability exists when the membrane 15 travels toward the substrate 10 a distance of at least one-third of the height of the unbiased air gap 20 in moving from its unbiased to its biased position. This instability causes the membrane 15 to be drawn to and contact the substrate 10. While the modulators described herein can function when the membrane 15 contacts the substrate, in the preferred embodiment such contact does not occur. One way to avoid the instability is to provide a relatively large air gap so that the membrane travel distance of one-quarter of the basis wavelength is a small fraction, i.e, less than one-third, of the height of the unbiased air gap. But, the larger the air gap, the greater the bias voltage requirement. An instability results when m equals 2 or 3 since, for m=2, the travel distance is one-half of the unbiased air gap: $[(2)\lambda/4-\lambda/4]/(2)\lambda/4=0.5$; and for m=3, since the travel distance is exactly one-third of the unbiased air gap: $[(3)\lambda/4-\lambda/2]/(3)\lambda/4=0.33$. If, however, the air gap 20 in its unbiased state is somewhat less than $3\lambda/4$, such as from about $0.65\lambda$ to about $0.7\lambda$, and the air gap 20 in its biased state is about $\lambda/2$, the instability will be avoided. While the modulator will not be at a maximum reflectivity in the unbiased state due to this deviation, the contrast ratio remains high since reflectivity approaches zero in the low reflectivity state, as shown in FIG. 18. By sacrificing some reflectivity, bias voltage requirements are minimized and the instability is avoided.

The above-described instability is believed to be due to the nature of the electrostatic force being applied. A mechanical stop could be located underneath the membrane 15 to prevent the membrane from contacting the substrate 10 even when operated in the instability region. If such a stop is incorporated into the modulator, it must not block the optical signal 2 from reaching the substrate 10. Repeated contact with the mechanical stop would, however, presumably shorten modulator life.

Figure 4:
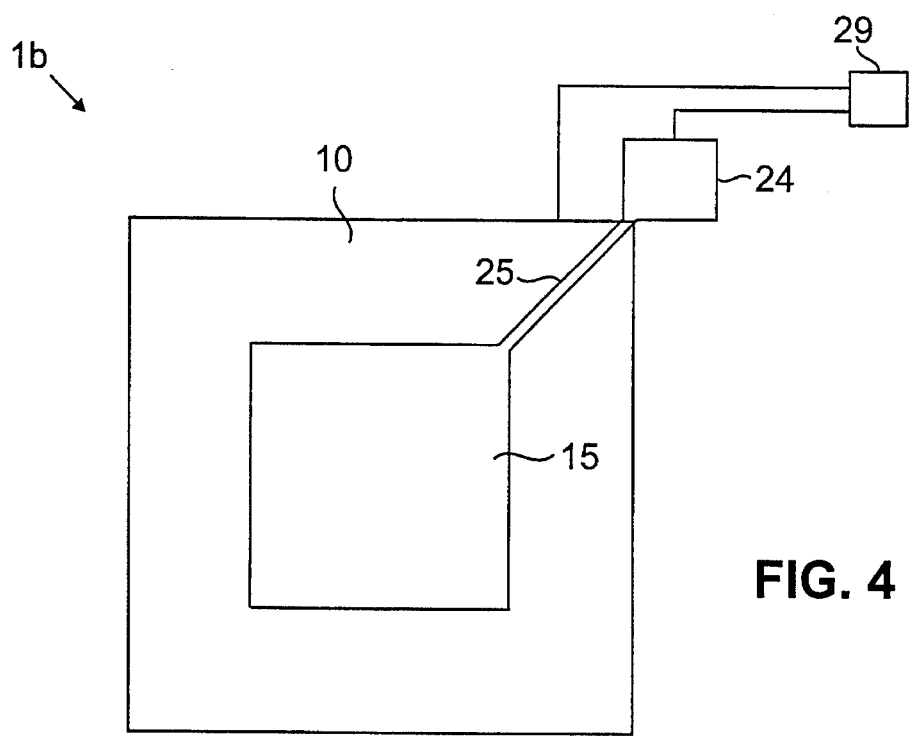
FIG. 4 is a plan view of a third embodiment of a micromechanical modulator according to the present invention wherein the membrane is supported by a cantilever beam.

The flexible support arms 25 that suspend the membrane 15 above the substrate 10 may be arranged in any convenient manner and may number more or less than the four arms pictured in FIGS. 2 and 2a. The flexible support arms 25 serve as a support means for the membrane 15 and also allow the membrane to move relative to the substrate. While a single structure, i.e., the support arms, provides this dual function, these functions could be provided by independent structures. For example, a rigid support used in conjunction with a separate flexing member can provide support and mobility for the membrane 15. Other configurations and arrangements capable of supporting the membrane 15, and allowing it to move, are within the contemplated scope of the present invention; it being recognized that such variations will occur to those skilled in the art in view of the present teachings. In addition, the support arms 25 may be part of the membrane 15, or, alternatively, may be a separate structure formed of a different material. Further, as shown in FIG. 4, a single support arm, i.e., a cantilever support, may be used.

As previously noted, the electrode 30 may comprise a layer of conductive material deposited on the membrane. Any suitably conductive material may be used to form the electrodes, including, without limitation, aluminum, platinum, tungsten, conducting silicon, ITO or, preferably, gold. As shown in FIG. 2a, the electrode 30 forms a continuous conductive layer covering at least a portion of the support arms 25 and the perimeter of the layer 15a forming a border region 17. The inner edge 19 of the border region 17 defines an optical window 16 in the membrane 15 for modulators, such as modulator 1a, having a discrete electrode 30. Such an optical window is required when the conductive material applied as the electrode 30 is not optically transparent at the operating wavelength of the modulator. A distinct optical window 16 is not required in the layer of conductive material when the conductive material is ITO, since ITO is optically transparent. The electrode 30 may further include a region 24 extending beyond each support arm 25. As shown in FIGS. 1 and 3, a contact 31 may be formed on the substrate 10 to facilitate electrical connection with the controlled voltage source 29. Such a contact point may be provided on the electrode 30 or conductive membrane layer, as well. As previously described, the separate electrode 30 is not required if any of the membrane layers are suitably conductive.

While the optical window 16 is shown to have a circular shape in FIG. 2a, the window 16 may have any shape. The size of the optical window will vary with the particular application for which the invention is used. The optical window 16 must sized so that the optical "spot" produced by the optical window will be captured by the numerical aperture of the waveguide or other optical device being used in conjunction with the invention. By minimizing the size of the optical window, the overall membrane size, and hence its mass, may be minimized. This reduction in mass results in a better response time for the modulator. Further, providing a conductive membrane layer results in a lower mass membrane relative to using a discrete electrode 30.

Figure 5:
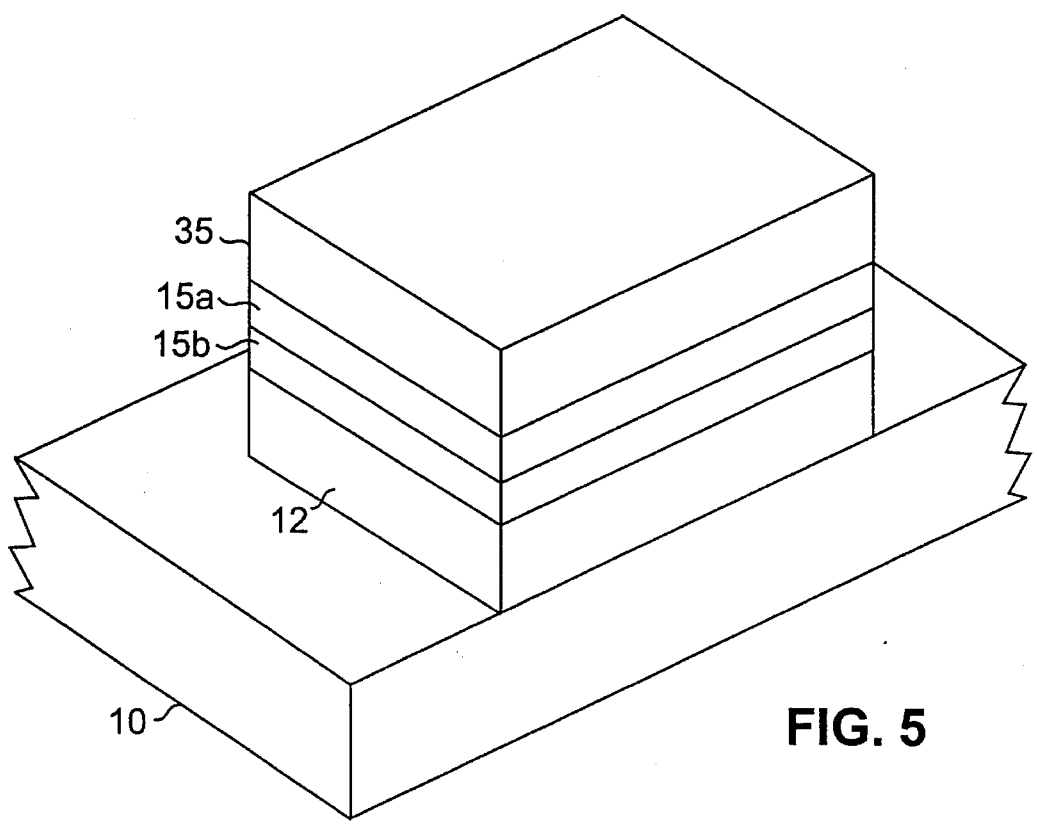
FIG. 5 is a perspective view of various layers of material deposited on a substrate, which layers will be patterned into a micromechanical modulator according to the present invention.

The micromechanical modulator 1 of FIGS. 1 and 2 may be formed as follows. While such a modulator may be comprised of a one-layer membrane, for the purposes of the following description the membrane is assumed to be comprised of two layers. The substrate 10, which may be in the form of a wafer, is preferably silicon which is doped with phosphorus or boron. As shown in FIG. 5, several layers of material, as described below, are deposited on the substrate 10. First, a sacrificial layer 12 of an erodible material is deposited on the substrate. The erodible material is chosen so that a suitable wet etch will erode this material at a much greater rate than any other of the materials which comprise the device. Suitable erodible materials include, but are not limited to, silicon dioxide and aluminum. Preferably, the erodible material is phospho-silicate glass ("PSG"), e.g., silicon dioxide doped with phosphorus. The erodible material is deposited to a thickness approximately equivalent to that desired for the unbiased air gap 20.

A layer of polysilicon or other suitable material is deposited to form layer 15b, as shown in FIG. 5. Next, a suitable material, preferably silicon nitride, is deposited to form the layer 15a. Layers 15a and 15b should be deposited to a thickness equal to about one-quarter of the basis wavelength of the incident optical beam 2. Layer thickness is measured in the materials comprising the layers.

The layer 15a is deposited under conditions so as to achieve a refractive index approximately equal to the square root of the refractive index of the substrate 10. Techniques for tailoring the refractive index of a material are well known to those skilled in the art See Smith et al ., "Mechanism of SiNxHy Deposition from $N_2$—$SiH_4$ Plasma," Jnl. Vac. Sci. Tech. B(8), #3 at 551–57 (1990). The layer 15b should have a refractive index which is approximately equal to the refractive index of the substrate 10.

Figure 6:
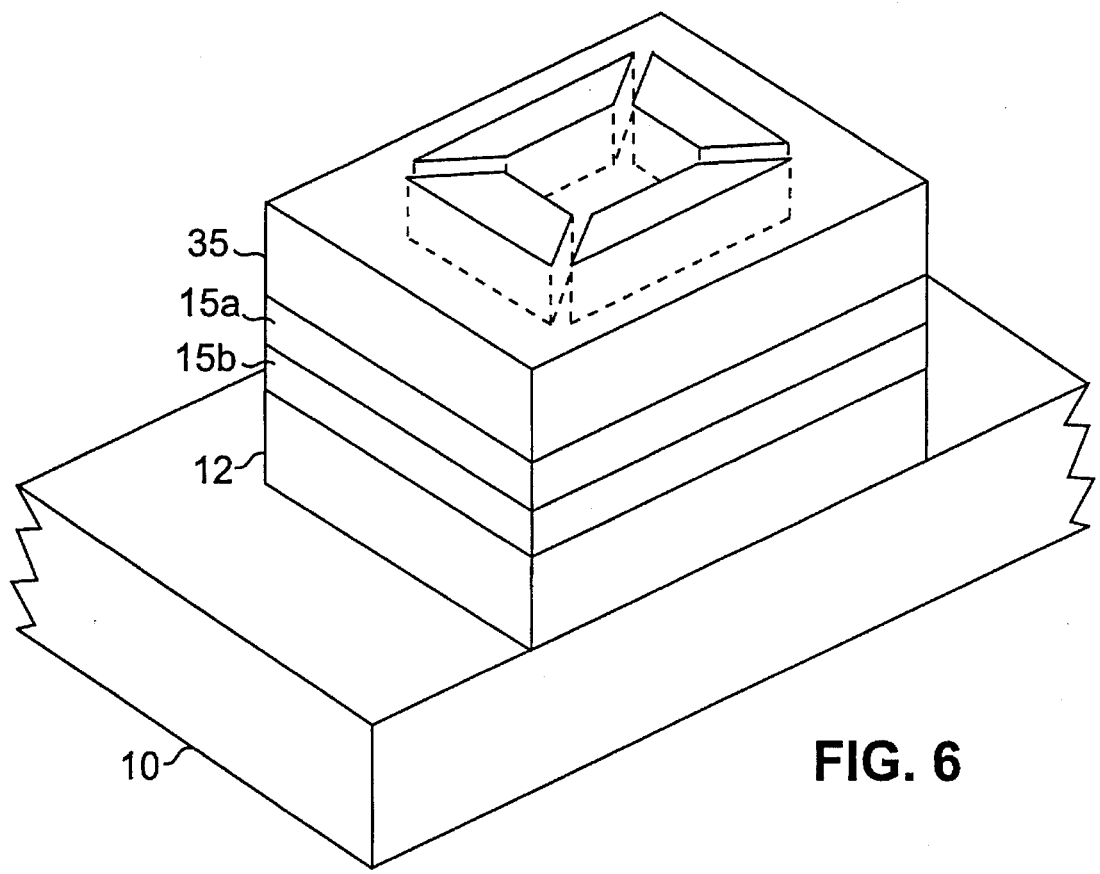
FIG. 6 shows the layers of FIG. 5 with holes patterned in the photoresist layer.

Photolithographic steps follow the deposition of these layers. The photolithographic process is well known to those skilled in the art and the details of this process will not be discussed in detail here. See Ruska, *Microelectronic Processing*, Chap. 4, "Photolithography," at 114–17 (1987) In the first photolithographic step, which may be referred to as the etch step, a photoresist 35 is applied to the uppermost membrane layer, which is the layer 15a in the embodiment shown in FIG. 5. Four openings are then created in the photoresist layer, as shown in FIG. 6, using an appropriately patterned mask. The openings are shown as trapezoidal in shape. The shapes of the openings are a function of the desired support arm arrangement. In the micromechanical modulator 1 shown in FIG. 2, the support arms 25 originate at the corners of a first square and terminate at the corners of a second smaller square (the membrane 15) located within the perimeter of first square. Thus, trapezoidal shaped openings define the structure. As previously discussed, the support arms 25 may be arranged in any convenient manner, may number more or less than four and may have any suitable physical configuration. For other support arm arrangements, the openings created in the photoresist layer may therefore differ in number and shape from those shown in the present example. Small openings, not shown, may be provided near the center of the membrane 15 to facilitate removal of a portion of the sacrificial layer 12 to create the air gap 20.

Figure 7:
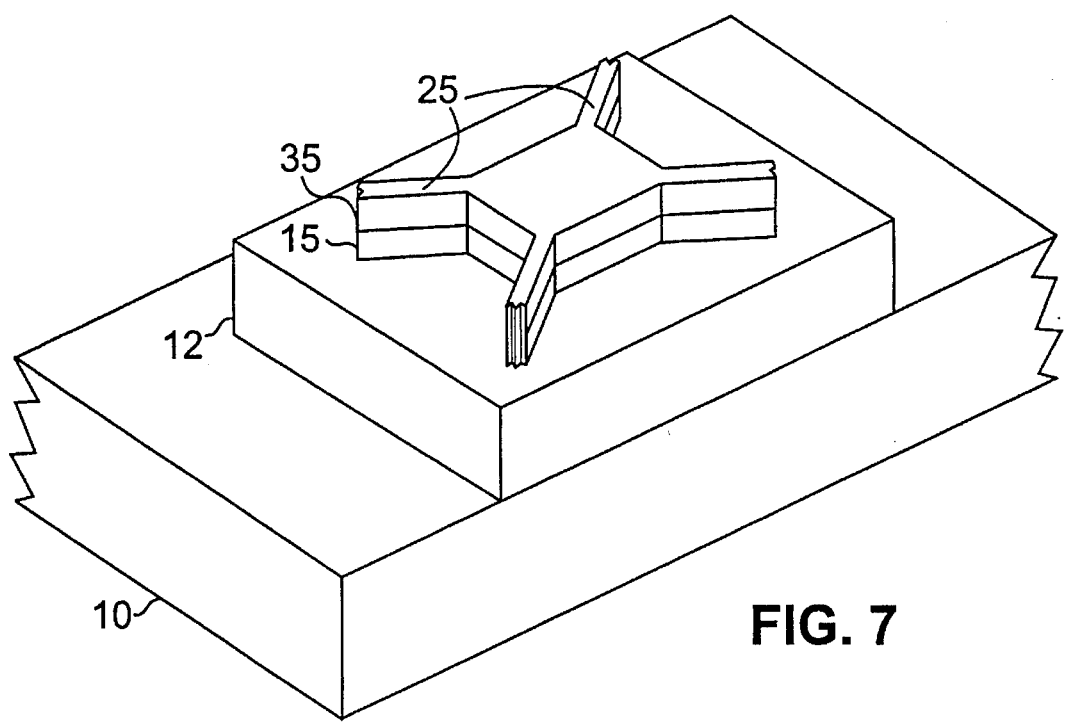
FIG. 7 is a cutaway view of the layers of FIG. 5 after patterning and etching to define the membrane and support arms.

The layers located beneath the trapezoidal openings are removed using reactive ion etching or other suitable methods. By forming four trapezoidal shaped openings in the layers 15a and 15b, the support arms 25 and the membrane 15 are defined, as shown in FIG. 7. FIG. 7 is a cutaway view, wherein the material used for the layers 15a and 15b and the photoresist surrounding the structure are not shown. It should be understood that the membrane 15 and support arms 25 are surrounded by material comprising layers 15a and 15b and 35, other than the trapezoidal shaped regions which have been removed as described.

Figure 8:
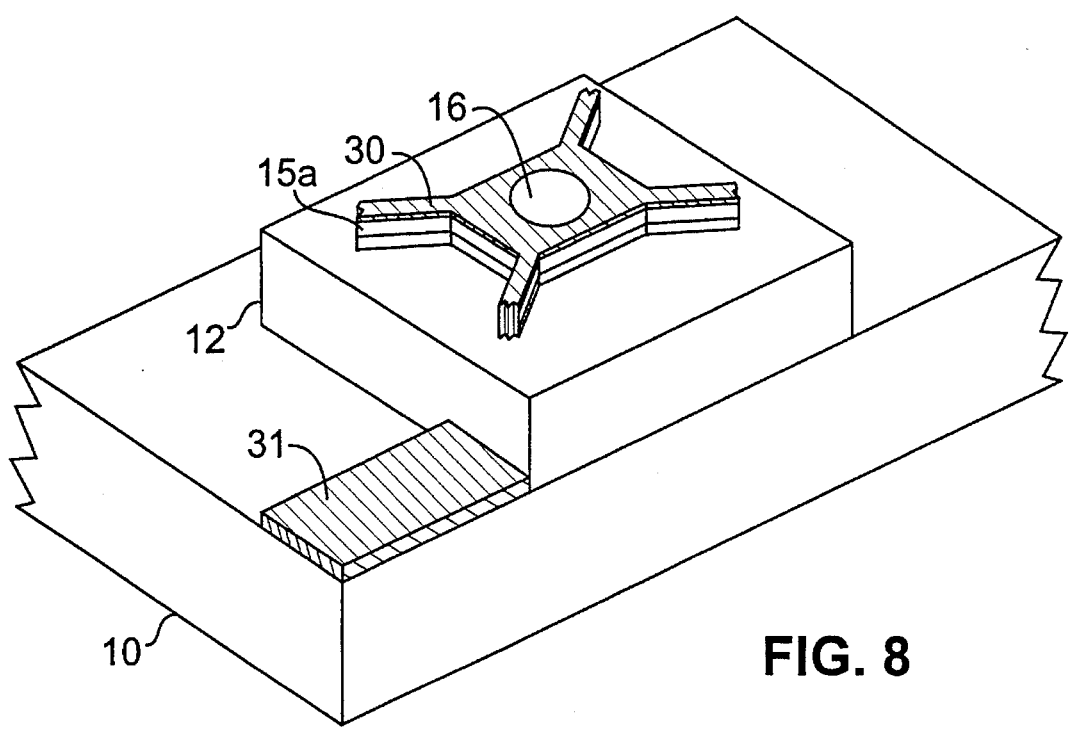
FIG. 8 shows contacts added to the arrangement shown in FIG. 7.

Hardened photoresist remaining on the structure is then removed. If a discrete electrode 30 is to be deposited on the layer 15a, a second photolithographic step is required. In such a case, photoresist is applied and patterned using a second photomask. The areas of the device, if any, which are not to be coated with conductive material are protected by the hardened photoresist. In the embodiment shown in FIG. 8, conductive material is deposited at discrete regions on the layer 15a. Specifically, conductive material may be deposited at a region 24 extending beyond each of the support arms, on the support arms 25 and along the edge of the layer 15b to form the border region 17, as shown in FIG. 3. The conductive material so deposited forms a continuous surface for electrical conduction, defining electrode 30. A contact 31 may also formed on the substrate 10 by depositing conductive material thereon.

Figure 9:
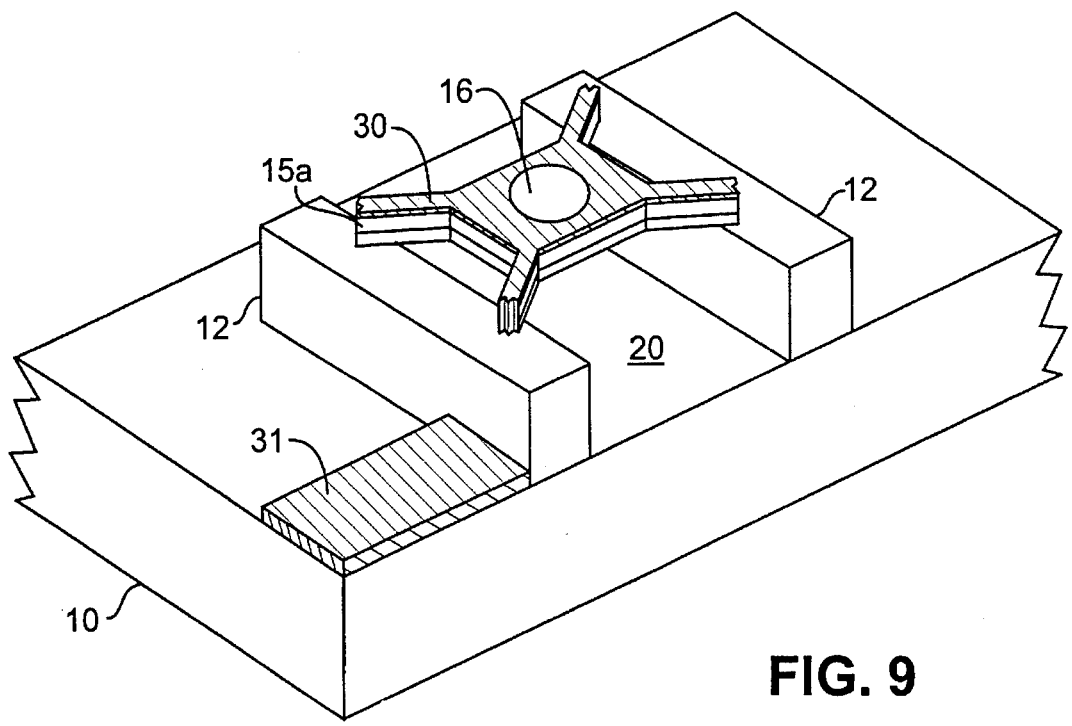
FIG. 9 shows the erodible layer etched away to form an air gap between the membrane and the substrate.

The structure is then placed in a suitable etch bath for etching the sacrificial layer 12 without attacking the silicon nitride. Suitable etches include, but are not limited to, commercial aluminum etchant if the sacrificial layer is aluminum, and HF acid-based solutions for PSG or aluminum sacrificial layers. As shown in FIG. 9, the air gap 20 is formed as the portion of the sacrificial layer 12 beneath the membrane 15 and support arms 25 is removed. The etch is timed to limit the amount of undercut of the membrane.

Figure 10:
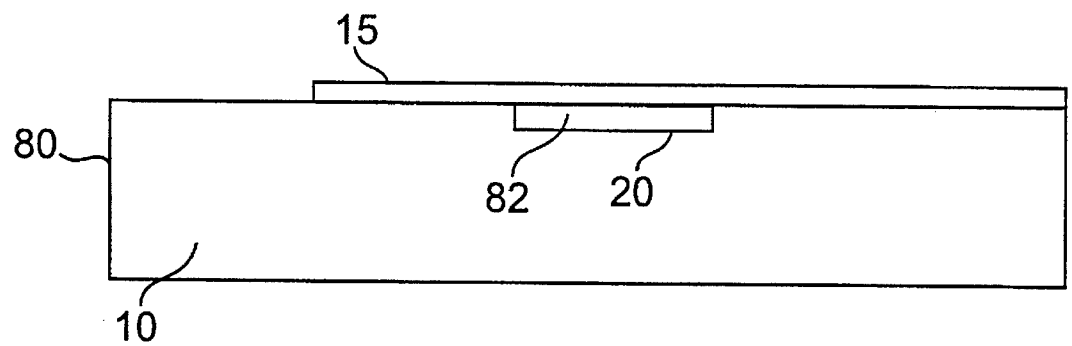
FIG. 10 shows a preferred embodiment of a micromechanical modulator according to the present invention.
Figure 11:
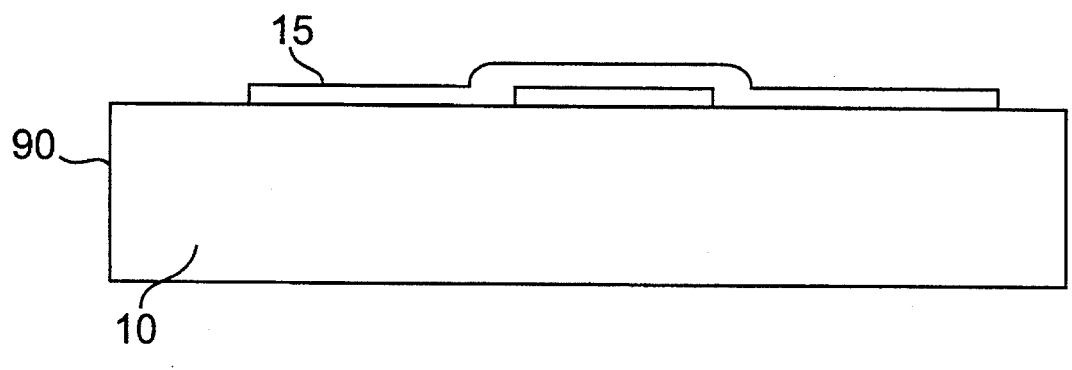
FIG. 11 shows a second preferred embodiment of a micromechanical modulator according to the present invention.

FIGS. 10 and 11 show two preferred embodiments of a micromechanical modulator according to the present invention. FIG. 10 shows a micromechanical modulator 80 wherein a well 82 is formed in the substrate 10. The membrane 15 is formed adjacent to the substrate 10. As in the previous embodiment, the membrane may be comprised of one or more layers, not shown. An air gap 20 is defined in the region where the membrane 15 overlays the well 82. As in the previous embodiment, if none of the membrane layers are suitably conductive, a discrete electrode 30, not shown, is provided on the membrane 15 so that a voltage can be applied to the device 80 generating an electrostatic force between the membrane and the substrate. The membrane 15 and support arms 25 (not shown) of the device 80 may have a configuration like the previous embodiment, or may be configured in other suitable arrangements which may occur to those skilled in the art inview of the teachings provided herein.

To form the microchemical modulator 80, the well 82 is formed im a suitably prepared substrate 10 using milling or etching techniques known to those skilled in the art. The depth of the well should be equal to the desired thickness of the air gap 20 when the membrane is in an unbiased position. The well 82 is then filled with an erodible material, preferably PSG. Next, the membrane layers 15b and 15a (assuming a two-layer membrane) are deposited as described for the previous embodiment. Photoresist is applied and patterned to form the membrane 15 and support arms 25 as previously discussed. The erodible material is etched away, resulting in the air gap 20. The well 82 defines the boundaries of the air gap, i.e., the extent of the etch, so the attention to the timing of the etch is not as critical as for the previous embodiment.

In a preferred embodiment for forming the micromechanical modulator 80, a silicon nitride layer is formed on a silicon wafer. An opening is formed in the silicon nitride layer down to the silicon wafer, at the intended site for the well 82. The opening may be formed using reactive ion etching or other methods known to those skilled in the art. The wafer, with the etched silicon nitride layer, is then placed in a thermal oxidation furnace. Silicon which is exposed to the atmosphere in the furnace, i.e., the silicon exposed as a result of the opening which is formed as described above, is oxidized. The oxide grows into the silicon wafer. This is the functional equivalent of filling the well 82 with silicon dioxide. Thermal oxidation is well characterized and understood by those skilled in the art. Through the appropriate combination of exposure time, furnace temperature and environment, the oxide penetration of the silicon wafer can be controlled to the desired depth, i.e, that depth which results in a suitable air gap 20 upon removal of the silicon oxide. The silicon oxide can be ion-implanted, with phosphorus or boron and phosphorous to enhance its solubility in HF-based solutions to facilitate removal, if desired. After removing the silicon nitride layer, material appropriate for forming the layers 15b and 15a, such as polysilicon and silicon nitride, is applied to the wafer. The layers are then patterned and etched, a contact layer is deposited if none of the membrane layers are conductive, and the silicon oxide is removed to form the well 82 which results in an air gap 20 between the layer 15b and the substrate 10, i.e., the silicon wafer.

Figure 12:
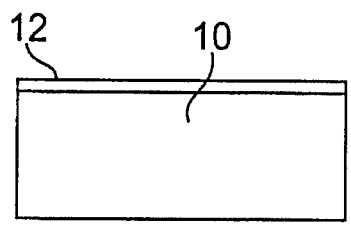
Figure 13:
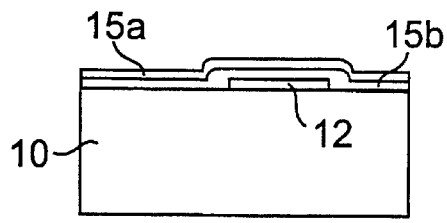
Figure 14A:
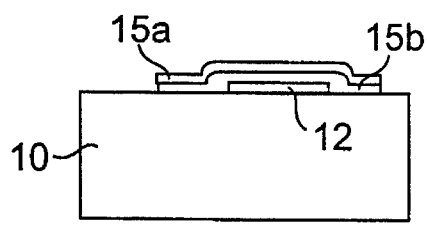
Figure 14B:
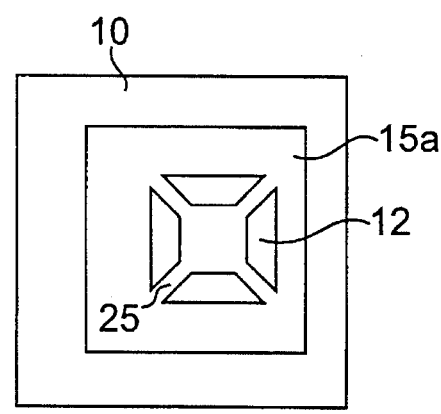
Figure 15A:
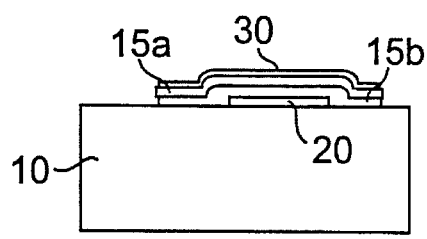
Figure 15B:
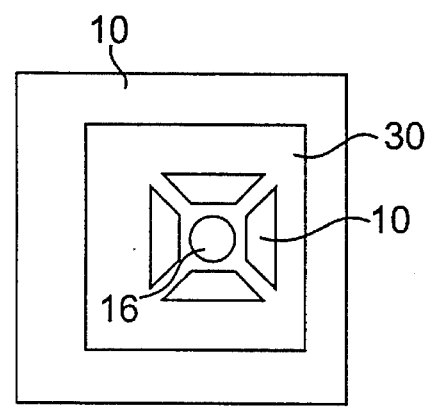

FIG. 11 shows a second preferred embodiment of a micromechanical modulator 90 according to the present invention. Rather than forming a well in the substrate to create the air gap 20, as in the previous embodiment, an "island" 13 of erodible material is formed on the substrate 10 which will be etched away to form the air gap 20. An exemplary embodiment of a method of making the micromechanical modulator 90 is illustrated in FIGS. 12–15b. As shown in FIG. 12, an appropriately prepared substrate 10 is coated with a Sacrificial layer 12 of erodible material. The sacrificial layer 12 is patterned into an "island" 13 having the dimensions desired for the air gap 20, shown in FIG. 13. The layers 15b and 15a are next deposited on the island 13 of erodible material. These layers extend beyond the island 13 onto the substrate 10. Photoresist is applied and the layers 15a and 15b are patterned into the membrane shape, as shown in cross section in FIG. 14a and in a plan view in FIG. 14b. Next, the electrode 30 is deposited and patterned, if appropriate. Finally, the erodible material is removed from beneath the layer 15b, forming an air gap 20 between the membrane and the substrate 10. The etch to remove the erodible material proceeds until the material forming the layer 15b is encountered. As in the previous embodiment, this simplifies the formation of the air gap relative to a timed etch. FIGS. 15a and 15b show the fully formed micromechanical modulator 90, including an electrode 30.

Figure 16:
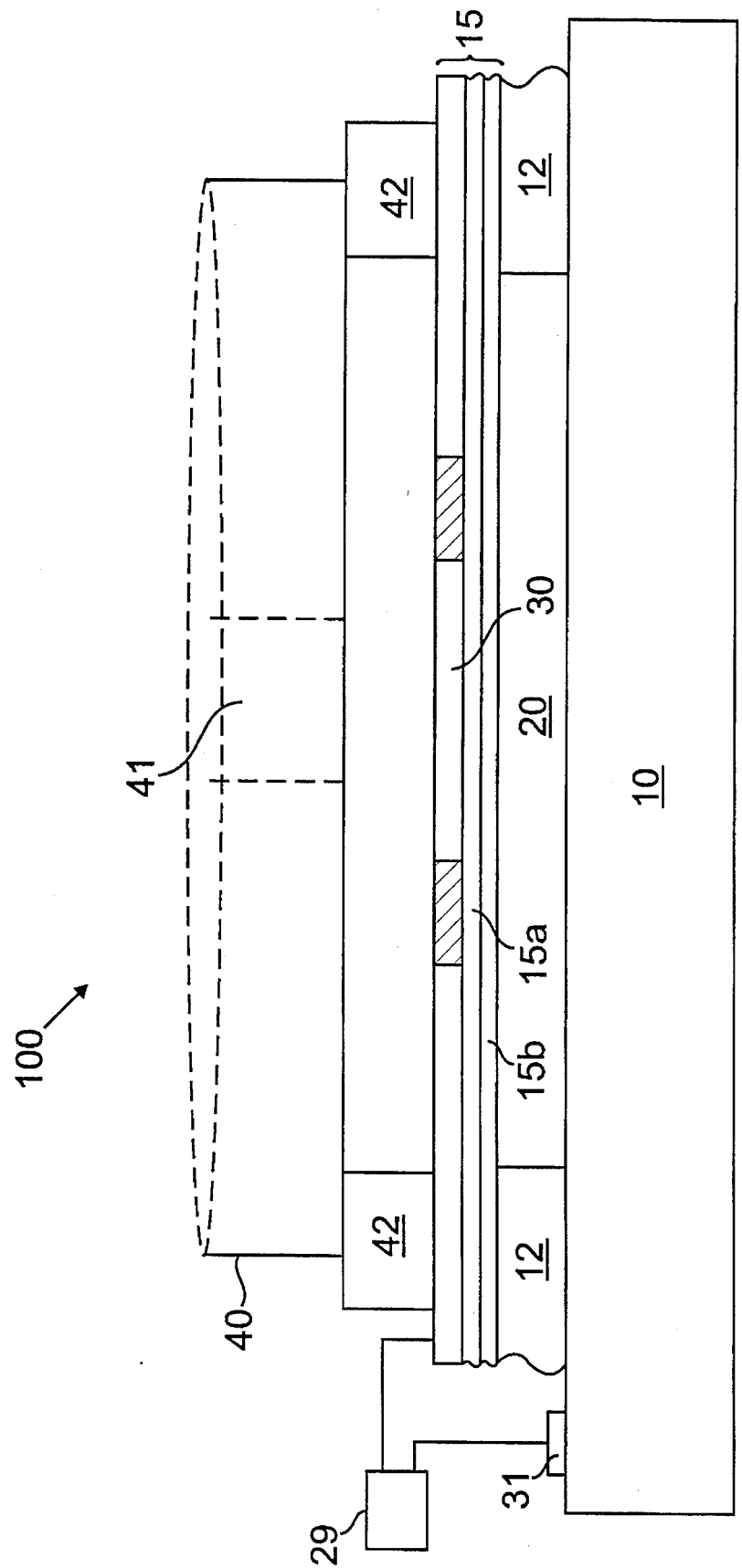
FIG. 16 is a side view of an embodiment of a modulator according to the present invention which incorporates an optical fiber.
Figure 17:
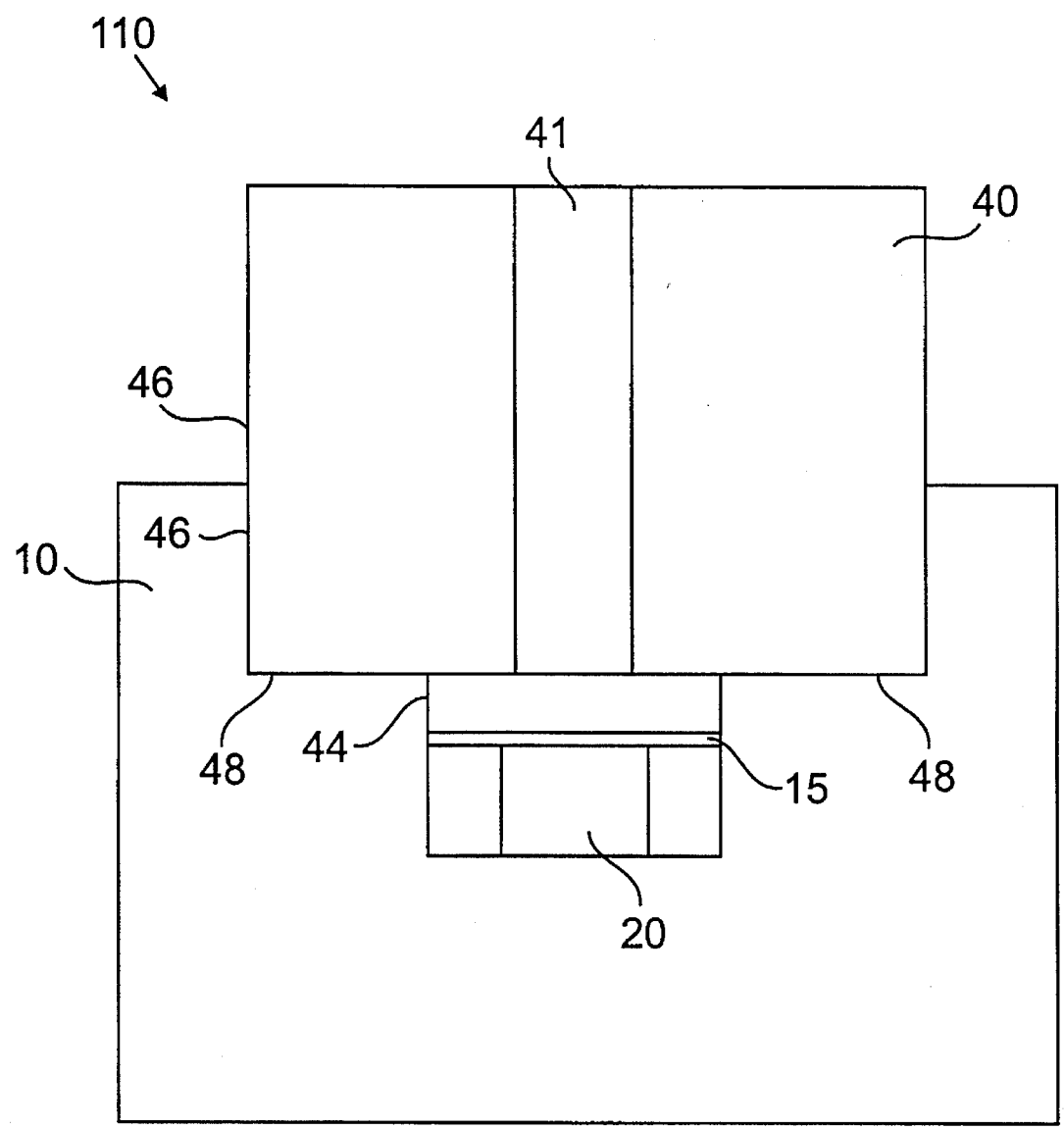
FIG. 17 is a side view of a second embodiment of a modulator according to the present invention which incorporates an optical fiber.

In other embodiments, illustrated in FIGS. 16 & 17, a micromechanical modulator according to the present invention comprises a membrane 15 and air gap 20, as well as an optical fiber 40 spaced from the membrane 15 to facilitate use in an optical fiber network. For example, as shown in FIG. 16, a modulator 100 may be fabricated by depositing an electrically insulating material such as silicon dioxide in an annular shape around the modulator 100 to form a support 42 for the fiber 40. Epoxy or other adhesive material may be used to cement the fiber 40 to the support 42. The fiber 40 is positioned at an odd or even multiple of one-quarter of the basis wavelength above the top of the unbiased membrane 15. If the fiber is positioned at an odd multiple of one-quarter of the basis wavelength above the unbiased membrane, then the air gap 20 between the unbiased membrane 15 and the substrate 10 should be an odd multiple of one-quarter of the basis wavelength. Similarly, if the fiber is at an even multiple of one-quarter of the basis wavelength above the top of the unbiased membrane 15, then the air gap 20 between the unbiased membrane 15 and the substrate 10 should be an even multiple of one-quarter of the basis wavelength. Preferably, the gap between the fiber 40 and the unbiased membrane 15 is $\lambda/4$ and the air gap 20 between the unbiased membrane 15 and the substrate 10 ranges from about $0.65\lambda$ to about $0.7\lambda$. The fiber 40 is preferably positioned so that the optical fiber core 41 is normal to, and in optical communication with, the membrane 15. If a discrete optical window 16 is present in the membrane 15, the fiber 40 must be in optical communication with the optical window.

In another embodiment of a micromechanical modulator 110, two wells, such as wells 44 and 46, are formed in a substrate 10 as shown in FIG. 17. In the well 44, a membrane 15 and an air gap 20 are formed according to any of the methods previously disclosed. Well 46 is sized to receive an optical fiber 40. The annular surface 48 created by the formation of the two wells 44, 46 supports the fiber 40 above the membrane 15. As in the previous embodiment, the fiber 40 is positioned at an odd or even multiple of one-quarter of the basis wavelength above the top of the unbiased membrane 15, with the air gap 20 having a complementary position as previously described. Again, the gap between the fiber 40 and the unbiased membrane 15 is preferably $\lambda/4$ and the air gap 20 between the unbiased membrane 15 and the substrate 10 preferably ranges from about $0.65\lambda$ to about $0.7\lambda$. Further, the fiber core 41 is normal to, and in optical communication with, the membrane 15 or the optical window 16 if present.

Where the micromechanical modulator includes an optical fiber, such as for the modulators 100 and 110, the layer 15b is characterized by a refractive index which is approximately equal to the square root of the product of the refractive indices of the substrate 10 and the fiber 40.

As previously noted, the membrane 15 may be comprised of one or more layers. The optional layer 15b allows the mechanical properties of the modulator to be tailored independently of the optical properties. In particular, the overall stress in the membrane 15 may be tailored by adjusting the stress in the layer 15b. This is particularly advantageous where layer 15a is silicon nitride, the preferred material for this layer, since the stress in a silicon nitride layer cannot be tailored independently of its refractive index.

It is preferred that modulators according to the present invention are formed and operated so that under the action of bias the membrane 15 moves towards the substrate 10. In other words, the size of the air gap 20 decreases under bias. Alternatively, it is within the contemplated scope of this invention that modulators be formed and operated so that the membrane 15 moves away from the substrate 10 under the action of bias, i.e., the air gap 20 increases. The optical properties of both versions are the same.

Such a modulator may be formed by suspending an electrode, such as a ring of conductive material, above the membrane 15, i.e., on the side of the membrane furthest from the substrate. By applying a bias voltage across the ring and the membrane 15, an electrostatic attraction will be created, moving the membrane 15 toward the ring, and away from the substrate. The electrode is not limited to a ring of conductive material. However, the configuration should be such that the optical signal will pass through the electrode with minimal signal attenuation.

Alternatively, a bias current rather than a voltage, may be supplied to the modulators discussed previously in this specification, such as modulators 1, 1a, 80, 90, 100 and 110. The current can be controlled to produce a magnetic repulsion between the membrane 15 and substrate 10 so that membrane will move away from the substrate under the action of bias.

The performance of a modulator having a one-layer membrane has been modeled in FIG. 18. The basis for the simulation is as follows. The membrane layer is assumed to be comprised of silicon nitride. The signal being modulated is assumed to have a bandwidth extending from 1400 nm to 1700 nm. Thus, the basis wavelength (A) is 1550 nm. The layer of silicon nitride which is 2072 angstroms (207.2 nanometers) thick and has a refractive index of 1.87. Thus, the thickness of the layer is the required $\lambda/4$ (($207.2 \times 1.87$)/1550). The substrate is silicon with a refractive index of 3.5.

As required, the refractive index of the layer of silicon nitride is approximately equal to the square root of the refractive index of the substrate.

The performance of a modulator having a two-layer membrane has been modeled in FIG. 19. The basis for the simulation is as follows. The upper layer of the membrane (15a) is assumed to be comprised of silicon nitride and the lower layer (15b) is assumed to be polysilicon. The signal being modulated is assumed to have a bandwidth extending from 1400 nm to 1700 nm. Thus, the basis wavelength ($\lambda$) is 1550 nm. The layer of silicon nitride is again 2072 angstroms (207.2 nanometers) thick and has a refractive index of 1.87. The layer of polysilicon has a thickness of 1107 angstroms and a refractive index of 3.5. Thus, the thickness of the polysilicon layer is also $\lambda/4$. The substrate is silicon with a refractive index of 3.5.

FIGS. 18 and 19 show the reflectivity of the device as a function of wavelength at a number of values for the air gap. In FIG. 18, an anti-reflection state is shown at reference numeral 50, which corresponds to an air gap if $\lambda/2$. A maximum reflectivity state is shown at reference numeral 60, which corresponds to an air gap of $3\lambda/4$. The reflectance spectra 56 shows the reflectivity of the modulator at an air gap of about $0.65\lambda$. In FIG. 19, an anti-reflection state is shown at reference numeral 70, which corresponds to an air gap if $\lambda/2$. A maximum reflectivity state is shown at reference numeral 80, which corresponds to an air gap of $3\lambda/4$. The reflectance spectra 76 shows the reflectivity of the modulator at an air gap of about $0.65\lambda$.

Modulator performance for a one- and a two-layer membrane modulator as characterized above may be evaluated from FIGS. 18 and 19, respectively. As shown in FIG. 18 for the one-layer membrane, when the air gap is $3\lambda/4$, shown at reference numeral 60, reflectivity is about 72 percent at the basis wavelength. When the air gap is equal to $\lambda/2$, shown at reference numeral 50, reflectivity approaches zero at the basis wavelength. Thus, contrast, i.e., the ratio of light reflected in the two states, is quite high at or near the basis wavelength. Similarly, FIG. 19 shows a high contrast ratio at or near the basis wavelength for a modulator having a two-layer membrane operating with a $3\lambda/4$ air gap in the unbiased state moving to $\lambda/2$ under bias, shown by reference numerals 70 and 80, respectively.

As previously described, a modulator operating with an unbiased air gap of $3\lambda/4$ moving to a biased air gap of $\lambda/2$ will be subject to an instability which causes the membrane to move beyond a $\lambda/2$ gap and snap down to the substrate. Thus, a preferred design has an unbiased air gap of about $0.65\lambda$, the reflectance curve of which is shown at reference numerals 56 and 76, for a one- and a two-layer membrane, respectively. As shown in FIG. 18, reflectivity for a one-layer membrane at such an air gap at the basis wavelength is about 62 percent, which is about 86 percent of the reflectivity at $3\lambda/4$. While some reflectivity is sacrificed, the instability is avoided since $(0.65\lambda - 0.5\lambda)/0.65\lambda < 0.33$. Further, regardless of the loss in reflectivity, contrast remains very high. Reflectivity for a two-layer membrane at an air gap of about $0.65\lambda$ is also about 62 percent, as shown at reference numeral 76 in FIG. 19.

It should be understood that the embodiments and variations shown and described herein are illustrative of the principles of this invention and that various modifications may occur to, and be implemented by, those skilled in the art without departing from the scope and spirit of the invention.

We claim:

1. A modulator for modulating an optical signal, the optical signal being comprised of at least one wavelength, comprising:

a substrate characterized by a refractive index;

a membrane having an optically transparent portion and comprising at least a first layer of material having a refractive index which is approximately equal to the square root of the refractive index of the substrate and a thickness approximately equal to one-quarter of a wavelength of the optical signal, as measured within the first layer;

a means for supplying bias to the membrane and substrate; and a flexible support for positioning the membrane in a spaced and superposed relation to the substrate defining an air gap having a variable size; wherein, in the absence of bias, the membrane has a first position and the air gap has a first size and, under the action of bias, the membrane moves to a second position and the air gap has a second size which is approximately an integer multiple of one-quarter of a wavelength of the optical signal, as measured in air, and wherein the size of the air gap when the membrane is in its first position is such that the difference between the first size and the second size is less than one-third of the first size;

wherein the change from the first to the second position causes a change in the amount of the optical signal that is reflected from the membrane.

2. The modulator of claim 1 wherein, under the action of bias, the flexible support flexes and the membrane moves toward the substrate.

3. The modulator of claim 2 wherein the substrate is a semiconductor.

4. The modulator of claim 2 wherein the substrate is silicon.

5. The modulator of claim 2 wherein the first layer of material is silicon nitride.

6. The modulator of claim 1 comprising a second layer of material having a refractive index which is approximately equal to the refractive index of the substrate and a thickness approximately equal to one-quarter of a wavelength of the optical signal, as measured within the second layer.

7. The modulator of claim 6 wherein the second layer of material is polysilicon.

8. The modulator of claim 2 wherein the first size of the air gap ranges from approximately sixty-five to seventy percent of the wavelength of the optical signal and the second size of the air gap is approximately fifty percent of the wavelength of the optical signal, as measured in air.

9. The modulator of claim 2 wherein at least a portion of the membrane is coated with a conductive material which is selected from the group consisting of aluminum, gold, platinum, tungsten, ITO and conducting silicon.

10. The modulator of claim 6 wherein the second layer of material is conductive.

11. The modulator of claim 2 wherein the substrate is conductive.

12. The modulator of claim 2 wherein the flexible support comprises a plurality of flexible support arms.

13. The modulator of claim 12 wherein at least a portion of the flexible support arms are conductive.

14. A modulator for modulating an optical signal, the optical signal being characterized by at least one wavelength, comprising:

a substrate characterized by a refractive index;

an optical fiber having a first end in optical communication with an optically transparent portion of a membrane;

the membrane having an optically transparent portion and comprising at least a first layer of material having a refractive index which is approximately equal to the square root of the product of the refractive indices of the substrate and the optical fiber and a thickness approximately equal to one-quarter of a wavelength of the optical signal, as measured within the first layer, a means for supplying bias to the membrane and substrate;

a flexible support for positioning the membrane in a spaced and superposed relation to the substrate defining an air gap having a variable size; wherein, in the absence of bias, the membrane has a first position and the air gap has a first size and, under the action of bias, the membrane moves to a second position and the air gap has a second size which is approximately an integer multiple of one-quarter of a wavelength of the optical signal, as measured in air, and wherein the size of the air gap when the membrane is in its first position is such that the difference between the first size and the second size is less than one-third of the first size, and wherein the first end of the optical fiber is in superposed relation to the membrane and is spaced from the membrane by approximately an integer multiple of one-quarter of a wavelength of the optical signal, as measured in air;

wherein the change from the first to the second position causes a change in the amount of the optical signal that is reflected from the membrane.

15. The modulator of claim 14 wherein the first size of the air gap ranges from approximately sixty-five to seventy percent of the wavelength of the optical signal and the second size of the air gap is approximately fifty percent of the wavelength of the optical signal, as measured in air.

16. The modulator of claim 14 where the first layer of material is silicon nitride.

17. A method for modulating an optical signal, the optical signal being characterized by at least one wavelength, by varying the reflectivity of a device, comprising the steps of:

(a) providing a device comprising:
 a substrate characterized by a refractive index;
 a membrane in spaced and superposed relation to the substrate wherein the membrane has an optically transparent portion and comprises at least a first layer of material having a refractive index which is approximately equal to the square root of the refractive index of the substrate and a thickness approximately equal to one-quarter of a wavelength of the optical signal, as measured within the first layer;

(b) exposing the membrane to the optical signal; and (c) applying a biasing voltage to move the membrane from a first unbiased position to a second position closer to the substrate causing a change in the reflectivity of the device;

wherein, when the membrane is in the second position, the air gap has a second size which is approximately an integer multiple of one-quarter of a wavelength of the optical signal, as measured in air, and wherein the air gap has a first size when the membrane is in its first position such that the difference between the first size and the second size is less than one-third of the first size.

18. The method of claim 17 wherein the step of providing a membrane further comprises orienting the membrane and substrate so that in the first size of the air gap is about sixty-five to seventy percent of the optical signal, as measured in air.

19. The method of claim 17 wherein the step of applying a biasing voltage comprises moving the membrane to the second position wherein the second size of the air gap is about fifty percent of the optical signal, as measured in air.

20. A method for fabricating a device having a low and a high reflectivity state for modulating an optical signal, which optical signal is characterized by at least one wavelength, comprising:

providing a substrate; and forming a membrane on the substrate so that an air gap is defined between the membrane and a portion of the substrate, the membrane comprising at least one layer of material which is formed so that it has a refractive index which is approximately equal to the square root of the refractive index of the substrate and a thickness approximately equal to one-quarter of a wavelength of the optical signal, as measured within the first layer;

wherein the membrane is supported by flexible supports so that the membrane may move relative to the substrate upon application of a force, and wherein the air gap is about sixty-five to seventy percent of the optical signal, as measured in air, before application of the force.

\* \* \* \* \*